United States Patent [19]
Teigen, deceased

[11] 3,805,895
[45] Apr. 23, 1974

[54] APPARATUS FOR HARVESTING POTATOES

[76] Inventor: Ferdinand Austin Teigen, deceased, late of 1767 Humboldt Ave., South, Minneapolis, Minn. 55403 by Dorothy Russell Teigen, administratrix

[22] Filed: Nov. 15, 1972

[21] Appl. No.: 306,618

Related U.S. Application Data

[63] Continuation-in-part of Ser. No. 188,698, Nov. 12, 1971, abandoned, Continuation-in-part of Ser. No. 57,921, Aug. 24, 1970, abandoned.

[52] U.S. Cl................................ 171/120, 171/15
[51] Int. Cl............................................ A01d 17/12
[58] Field of Search......... 171/124, 128, 18, 20, 94, 171/101, 117, 120, 114, 15

[56] References Cited
UNITED STATES PATENTS
2,073,041   3/1937   Wolter................................ 171/120
1,399,876   12/1921  Pulliam.............................. 171/120
1,351,948   9/1920   Fowler................................ 171/15

Primary Examiner—Antonio F. Guida
Attorney, Agent, or Firm—James R. Cwayna

[57] ABSTRACT

A method and apparatus for harvesting potatoes by providing means for initially removing the same from the ground along with superfluous ground material, elevating the potatoes and material to a first loading area, which area is defined by a guiding, material passing stationary back and side walls and a movable front wall carrying a plurality of extending lifting and driving members which form with the other elements transitory receptacles for completely incarcerating the potatoes for elevating the same to a desired elevation.

4 Claims, 5 Drawing Figures

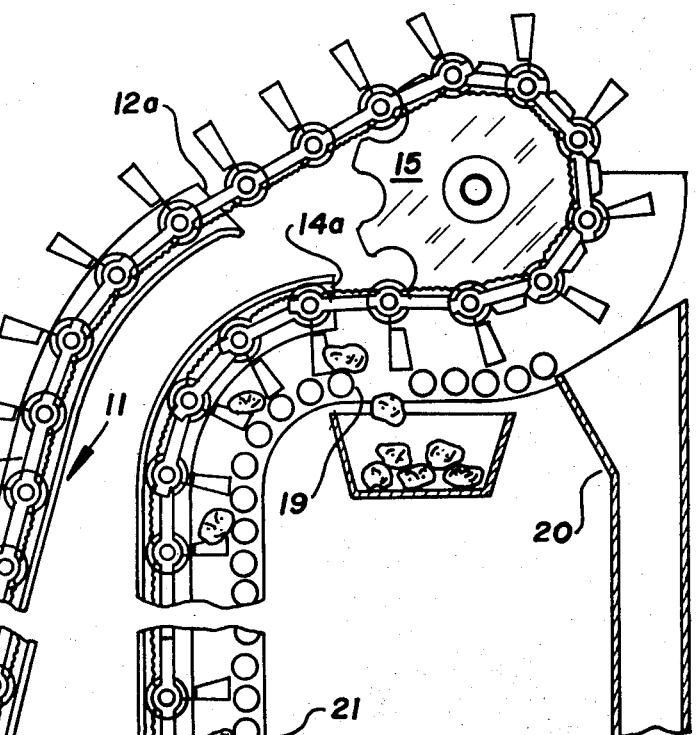
FIG. 1
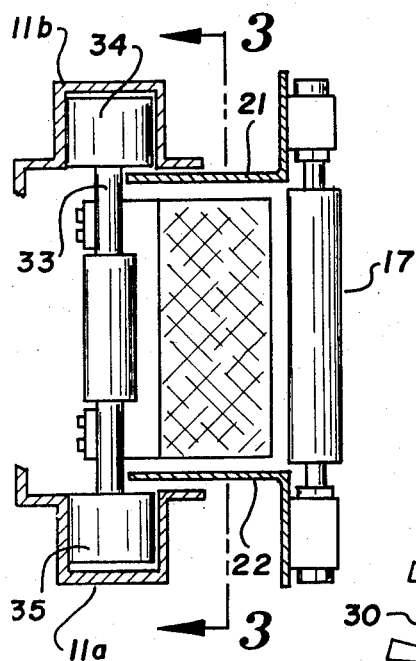
FIG. 2
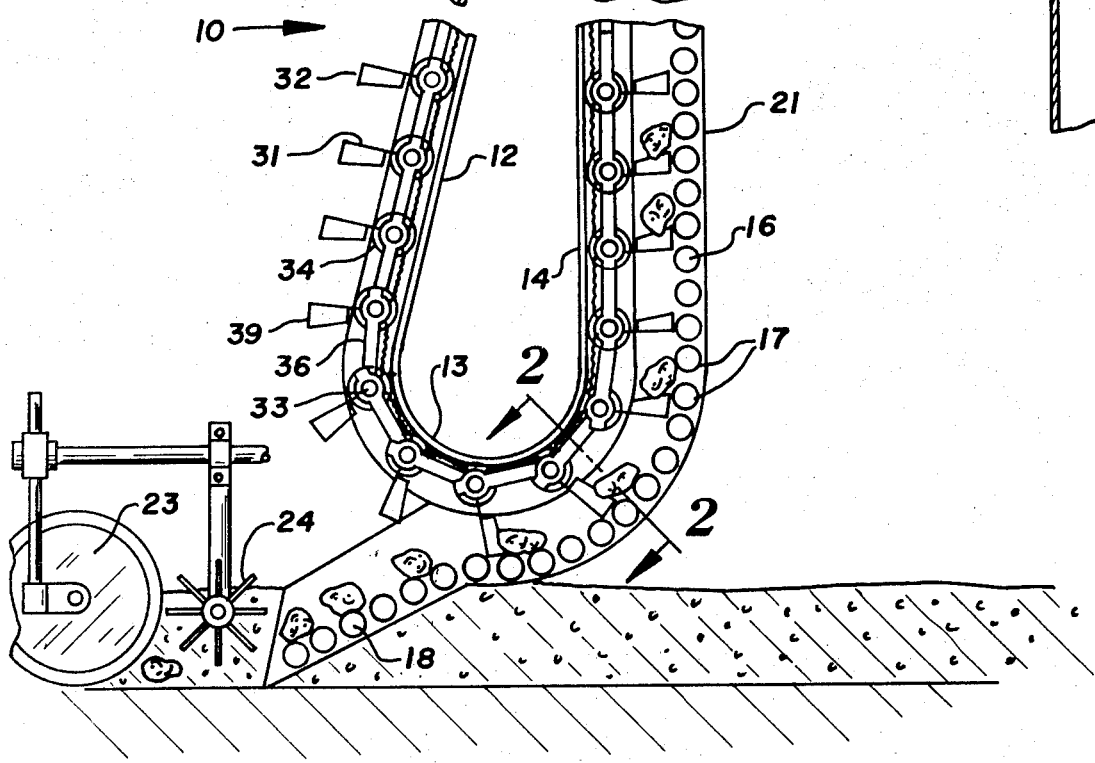

APPARATUS FOR HARVESTING POTATOES

This application is a continuation-in-part of an earlier filed application Ser. No. 188,698, Filed Nov. 12, 1971 and now abandoned which, in turn, is a continuation-in-part of application Ser. No. 57,921, filed Aug. 24, 1970, and now abandoned.

This invention relates to the provision and utilization of a method of elevating potatoes forthwith when dug by which method damage to potatoes is inhibited and cost of the harvesting operation is, substantially reduced.

For anyone, even though well versed in potato culture, to comprehend the concept of and operation provided by, the present invention is difficult unless it is first understood that the basic concept is to provide a unique, specific method of elevating potatoes forthwith when dug in a manner by which resultant damage is inhibited and cost of operation are reduced. To inhibit deterioration, potatoes must be elevated into a conveyance for transport from the field forthwith when dug and to provide only an improvement in apparatus for elevating potatoes is not the only concept of the present invention but also the method for performing the same in an inportant concept.

It must also be understood that elevating potatoes in a manner by which damage is inhibited and costs are reduced is accomplished by and is the result of operatively elevating potatoes forthwith when dug pursuant to the unique and specific steps and operations provided by the present invention, and not by simply elevating potatoes pursuant to methods heretofore used, and as particularly illustrated in certain granted United States Letters Patent.

Prior to this invention, the only method generally used of mechanically elevating potatoes is comprised of conveying potatoes on the top runs of a series of endless belt conveyors positioned at an incline to each other. This method is commonly referred to as the "belt conveyor method".

Potatoes being substantially roundish, readily roll down an incline: therefore, the incline of said "belt conveyor method" must be of a degree sufficiently low to preclude potatoes from rolling downward or off of the conveyors; consequently, the incline of the conveyors must be of a very slight degree. Because of said low, or slight, degree of said conveyors' incline, the length of said conveyors must be correspondingly greater in order to elevate potatoes to a given elevation.

The number of and length of conveyors required for an apparatus having the capacity to elevate potatoes to a given elevation varies in accordance with variations in the desired elevation but to elevate potatoes substantially five feet with the "belt conveyor method," at least four conveyors are used. To elevate potatoes to the ten foot elevation required for receivers of maximum desired capacity therefore requires a correspondingly greater number of conveyors.

The use of four conveyors requires five transfers of potatoes to and from said conveyors. In other words, the potatoes are brought five times to an instantaneous dead stop when they have been moved at a relatively high velocity.

That some potatoes are bruised, scarified, injured, wounded or otherwise damaged as and when dashed against each other at even a low velocity is a familiar fact. All one has to do to verify this statement is to drop freshly dug potatoes four or five times on other freshly dug potatoes a foot or two apart, and then watch the results during the ensuing months. The experience of potato growers in this respect is conclusive.

The present invention provides a method of elevating potatoes forthwith when dug from the earth wherein grown in a substantially vertical plane to the elevation desired in and by a single operation, which eliminates transferring potatoes several times from one conveyor to another. Elimination of the transference of potatoes several times from one conveyor to another inhibits resultant damage.

A basic object of the present invention is to reduce the damage caused by transferring potatoes forthwith when dug several times from one conveyor to another to thereby elevate said potatoes rather by transferring potatoes to potato-tight perforated receptacles, each having four walls, a floor and a top, and elevating the potatoes vertically by elevating said receptacles vertically to the desired elevation pursuant to and in accordance with methods provided by the present invention.

Another object of the present invention is the elimination of damage caused by bouncing potatoes in an effort to separate potatoes from and dissipate superfluous matter by elevating surface matter and potatoes in a substantially vertical plane while in engagement with a movable surface that permits the passage of surface matter while retaining the potatoes.

Another object of the present invention is to eliminate the damage caused when potatoes roll downward on or from conveyors in an effort to elevate said potatoes by incarcerating potatoes in a potato-tight perforated receptacle and elevating said incarcerated potatoes by elevating said receptacles to the elevation desired.

Another object of the present invention is to eliminate the damage caused by dragging, pushing, or pulling potatoes on a stationary surface by elevating potatoes on a movable surface.

These and other objects and advantages of the invention will more fully appear from the following description made in connection with the accompanying drawings wherein like reference characters refer to the same or similar parts throughout the accompanying views, and in which:

FIG. 1 is a schematic side elevation of a unit of a potato harvesting machine which performs the method and operated in accordance with applicant's invention;

FIG. 2 is a transverse section taken substantially along Line 2—2 of FIG. 1;

Figure 3:
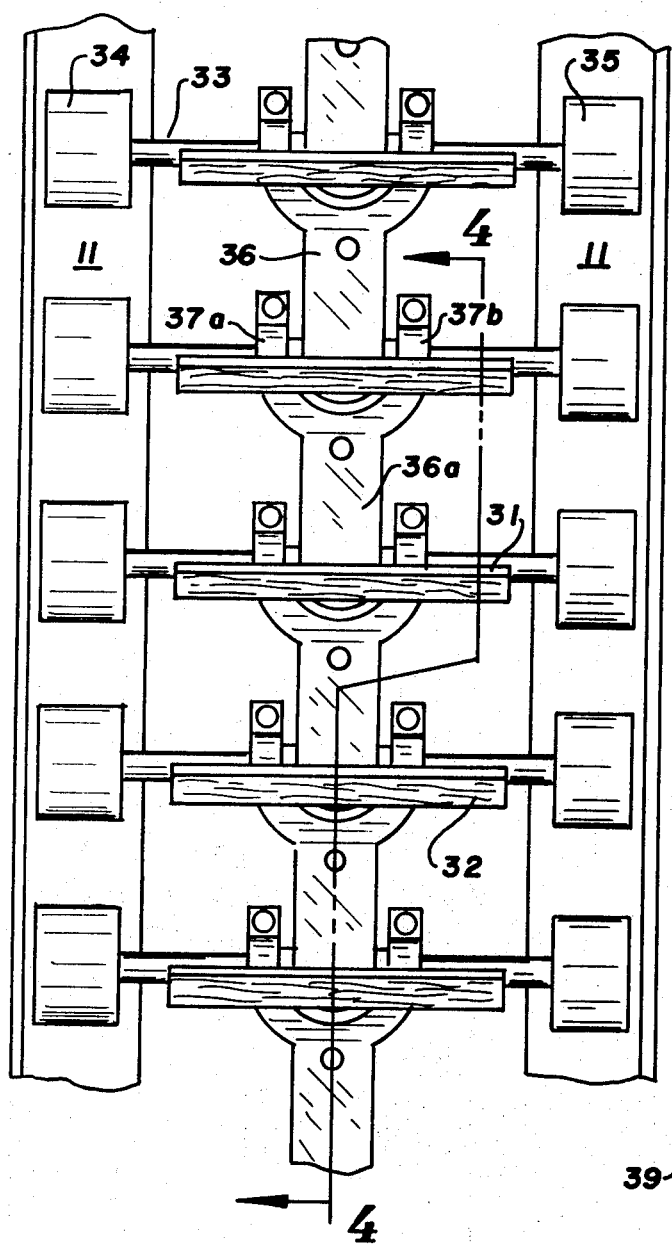
FIG. 3 is a vertical section taken substantially along Line 3—3 of FIG. 2.
Figure 4:
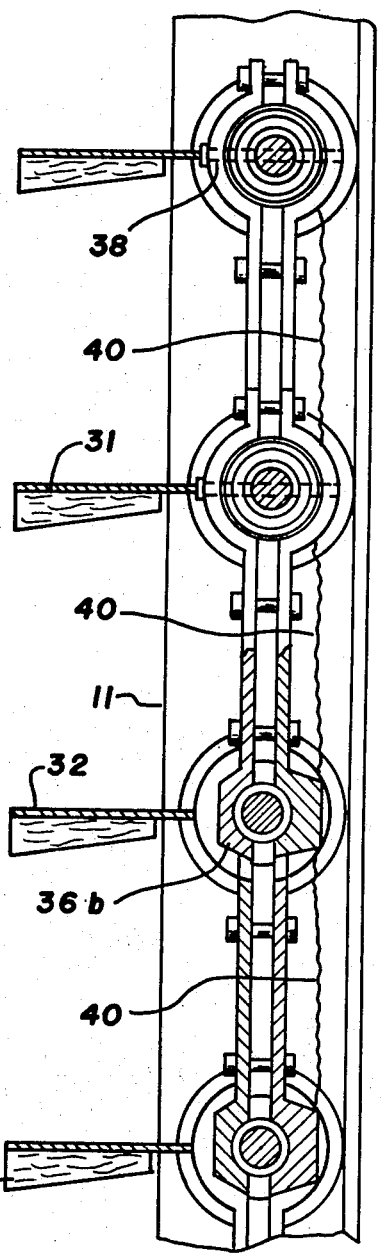
FIG. 4 is a view taken substantially along Line 4—4 of FIG. 3.

FIG. 1 is a side elevation of one of a plurality of identical harvesting units 10 comprising, when assembled, a potato harvesting operative unit performing in and pursuant to the methods of applicant's concepts as presented herewithin. The single unit 10 and other identical units 10, comprising in combination a harvester are mounted in a frame on wheels and are mobile, preferably, but not necessarily self-propelled.

Each unit 10 has the capacity to harvest only one row of potatoes at a time and therefore a harvest must have the capacity to harvest a number of rows of potatoes at one time. For example, harvesters having four units 10 have the capacity to harvest four rows of potatoes.

Each of the individual harvesters 10 includes a guiding channel device 11 which consists of a pair of spaced apart guiding members 11a, 11b formed in such a manner to provide a downwardly and slightly forwardly extending portion 12, an arcuate lower portion 13 and a generally vertically upstanding portion 14. The lower arcuate portion 13 is particularly illustrated in FIG. 5 and further explanation of certain important characteristics and functions of this portion will be given in a further description of this particular figure.

It should be noted that this guiding channel 11 does not extend entirely around the path for continuous operation but rather, as illustrated in FIG. 1, the upwardly, generally vertical portion 14 bends to an approximate horizontal position and thereafter terminates as at 14a. At this point of termination, or slightly therebehind, a drive member such as a sprocket 15 is provided. The guiding channel 11 is initiated forwardly of the drive sprocket as at 12a. The entire consideration of this guiding channel 11 and its various components thereof is to provide a means for delivering a certain set of continuous propeller members or the like in a direction of travel such that they will enter the lower arcuate portion 13 and form receptacles with other provided portions to incarcerate potatoes and other superfluous matter when harvested and separate the potatoes from the matter and deliver the potatoes to a selected desired height in a substantially vertical plane.

A second, what may be considered to be at least in part, a stationary conveying portion is formed to receive potatoes and assist in their delivery through the substantially vertical portion of travel to the desired elevation. This section is generally designated 16 and consists of several portions. A first portion may be termed a movable but stationary section consisting of a plurality of spaced apart roller members 17 which roller members are spaced to allow the superfluous matter to pass therethrough as the potatoes and the superfluous matter is moved therepast. As illustrated in FIG. 1 these rollers are arranged in a first inclined section 18 having a leading edge arranged to pass below the potatoes being harvested and therefore pick up and harvest the same and also to pick up therewith a certain quantity of superfluous matter in which the potatoes are grown.

Figure 5:
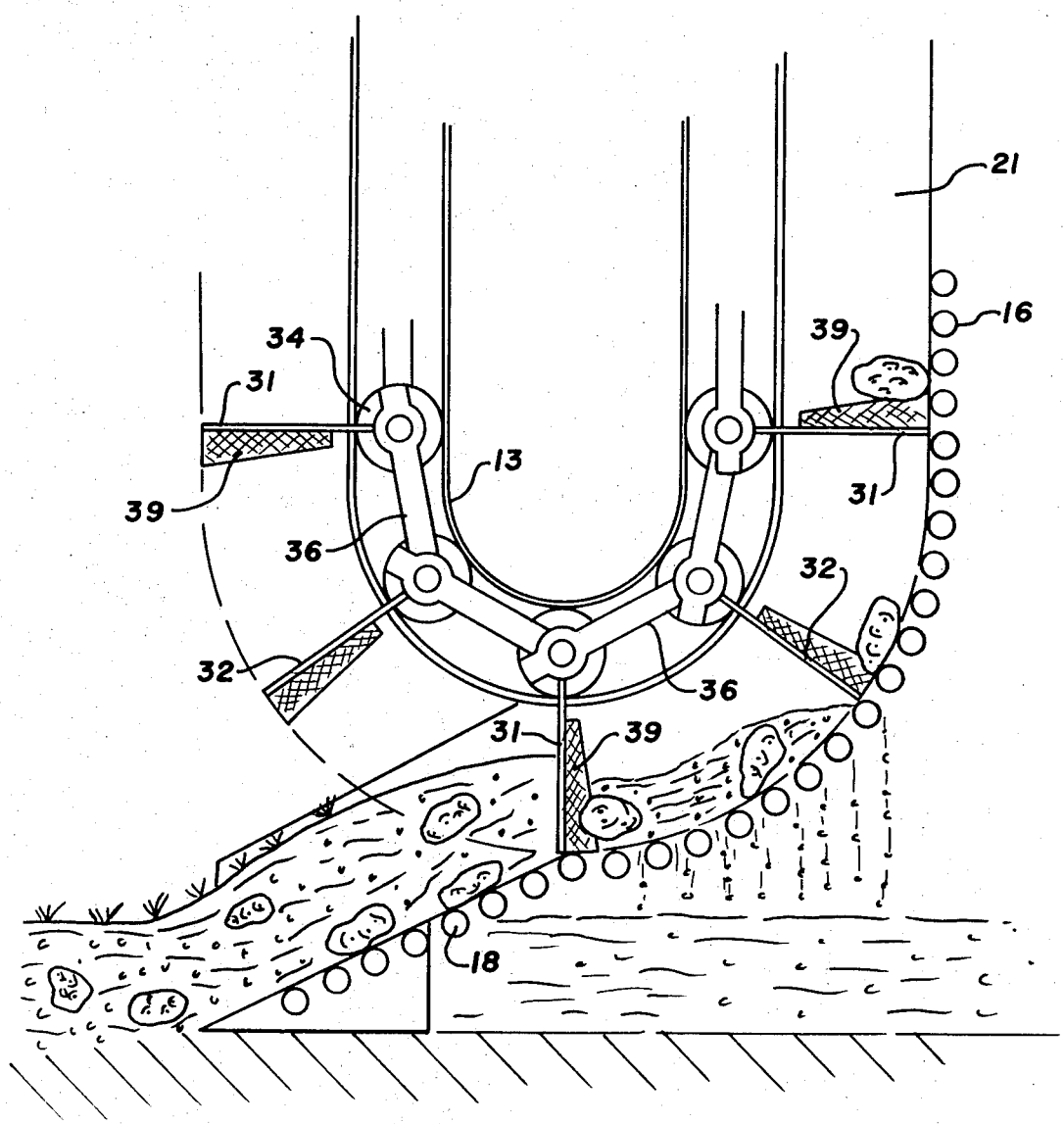
FIG. 5 is an illustration of a selected portion of FIG. 1 and being drawn to an enlarged scale and particularly illustrating the incarceration of potatoes into potato-tight receptacles, which receptacles are formed for the incarceration and elevation of the potatoes.

As illustrated in FIG. 1 and as will be also discussed in consideration of FIG. 5, at the uppermost edge of the incline of the rollers section 18, which uppermost section directly underlies the radial line passing through the center of the arcuate lower section 13 of guide channels 11, the roller section 16 complies with the formed guiding channels 11a, 11b and remains a constant distance therefrom and follows the same through its generally vertical ascent. Roller section 16, consisting of rollers 17 extends beyond the termination of the horizontal guiding poriton 14a a predetermined distance to overlie a disposal section 20 for the disposal of superfluous matter that may have accompanied the potatoes to this point. It should also be noted that a break 19 occurs in this roller section such that potatoes may pass therethrough after having been raised to a desirable vertical height as represented by the horizontal attitude of the roller section. It should also be noted that directly under this break 19, a conveying receptacle may be arranged to receive the potatoes therefrom and deliver the same to a proper market conveying apparatus. One particular feature of this roller section 16, the same being continuous from below the harvest line to the point of delivery at the desired elevation, and the rollers 17 being individually mounted for their rotation, and the rollers 17 being spaced for the passage of superfluous materail, a continuous stationary but moveable surface is provided and potatoes moving therewith and thereagainst will not suffer the damage as afforded in a belt conveyor.

Arranged on each side of the rollers 17 and forming entirely along the roller sections 16 and 18 are a pair of spaced side elements 21, 22 which conform to the inclined portion 18 of the roller section and the generally vertical portion thereof and may extend past the disposal section 20 of the unit arranged at the ultimate end of the roller section. These sides 21, 22 form with the roller section 16 three sides for a potatoe incercerating receptacle.

In the form shown, directly forwardly of the lower edge of the inclined portion of the roller and side section 18 are certain cutting devices. These devices may consist of coulters 23 and may include a pair of such coulters for cutting the vines and also the soil on both sides of the potato row being harvested, and directly therebehind a further propelling device 24 that may also aid in breaking up the soil for the ultimate separation of the soil from the potatoes being harvested is provided. It should be noted that this harvester unit is for one row of potatoes and therefore such a coulter arrangement would assist in the initial elimination of superfluous material which is passed through the harvester.

Means for driving, carrying and forming the carrying receptacles for the potatoes are provided on a continuous operatively driven member which could be classified for exemplary purposes as a chain designated 30. This entire driving member 30 consists of a plurality of receptacle forming members designated respectively 31, 32 only for the purposes of indicating that they each perform two individual functions within the method and these functions are to perform as both a top and a bottom to each of the receptacles being formed. The means for carrying each of these members consists of supplying a shaft member 33 carried between a pair of roller members 34, 35 which roller members are in turn carried in the guiding channels 11a, 11b. The means for mounting each of such driving members 31, 32 upon the shafts 33 is as follows, and as best illustrated in FIG. 3. A bifurcated yoke member 36 is provided having a single rearwardly extending member 36a and a pair of forwardly extending arm members 37a, 37b. The forward portions 37a, 37b are provided to surround shafts 33 and shear pins may be received through each of the same to provide a connection to the shaft 33 and the rear portion 36a is provided with a bearing member 36b to permit the same to revolve and permit the yoke 36 to accommodate itself within the channel 11. Driving members 31, 32 are secured to the forward bifurcated sections 37a, 37b and extend outwardly therefrom and as the same are relatively mounted, there is alignment for the same as they are propelled about the guiding channel 11. It should also be noted that the, what will ultimately end up to be the potato supporting surface of each of the driving members 31 or 32 is provided with a resilient cushioning member 39 such that the potatoes will not be exposed to any relatively hard surfaces during their incarceration and movement. To provide a fourth side to the receptacle being formed, a perforate member 40 may be carried by the bottom of the yoke member 36 and extend upwardly towards the next such member so that the rollers 17, the aforementioned sides 21, 22 and this perforate member 40 will provide four sides to the receptacle and it should further be noted that only two of such sides are totally stationary, these sides being sides 21, 22 the remaining sides 40 being driven along with the driving yoke and the rollers 17 although being stationary are in effect a moving side as they are rotatably mounted.

Some particualr consideration should be given FIG. 5 as it is this portion of the invention that permits the formation of the potato incarcerating, carrying and delivering receptacles.

It should be noted and as previously stated, the lower guiding section 13 is generally arcuate in shape and the roller section 17 thereunder is formed in conformance thereto, such that a driving member 21 in radial alignment with the center of this arcuate section will enclose a certain amount of matter which will include potatoes and superfluous material between the sides 21, 22 the rollers 17 and itself as well as the wall 40 and the previously driven driving member 32. This arcuate relation sweeps and drives the potatoes and matter but also forms a proper receptacle for incarceration of the same such that the same may be moved past the perforate wall formed by the stationary but moveable roller section 17 to permit the separation of superfluous matter from the potatoes and allow the same to be carried in their incarcerated condition to the proper, desired elevation for their discharge by the elimination of the incarcerating capacity of the receptacles by the elimination of the rollers 17 provided at the break at 19.

It should be noted that the generation of this receptacle is started when the previous driving member is at the top of the incline portion 18 and is completed when the next subsequent driving member reaches this same point. During this period of formation, the matter is forced into the receptacle to concurrently and conjunctively harvest the potatoes and superfluous matter with the formation of the receptacles. The dissipation of the superfluous matter is obtained by elevating the receptacles while conjunctively and concurrently engaging the matter with the rollers 17.

It should be obvious then that applicant provides a unique method for the harvesting, removal of superfluous matter and elevation of potatoes through the provision of incarcerating the potatoes and matter in receptacles and elevating the receptacle to this desired elevation.

What I claim is:

1. Apparatus for harvesting potatoes including:
   a. a first rearwardly inclined digging portion to remove potatoes and matter from the ground and deliver the same to a receptacle forming area;
   b. guide means defining a track and extending substantially vertically upward from said forming area;
   c. a housing defining section including a pair of spaced stationary walls adjacent said vertical portion of said guide means and a stationary, perforate rear wall spaced from said guide means, said perforate wall including a plurality of spaced apart rotatably mounted elements;
   d. a plurality of driving members arranged for movement in said guide means and through said housing section for forming receptacle therewith for carrying potatoes therealong; and,
   e. drive means for carrying and driving said members whereby the potatoes are elevated to a desired elevation.

2. The apparatus of claim 1 and said means for carrying and driving said driving members including means for mounting said members thereon to extend laterally outward therefrom.

3. The apparatus of claim 2 and said carrying and driving means including a perforate section between said driving members.

4. The apparatus of claim 1 and said housing defining section and said guide means including a horizontally extending section adjacent the top of said vertical section, and an opening formed in the horizontal portion of said rear wall for passing potatoes therethrough.

* * * * *